April 14, 1959   J. A. F. ROCHÉ ET AL   2,881,827
FUEL MANIFOLD DRAINAGE SYSTEM
Filed June 24, 1953
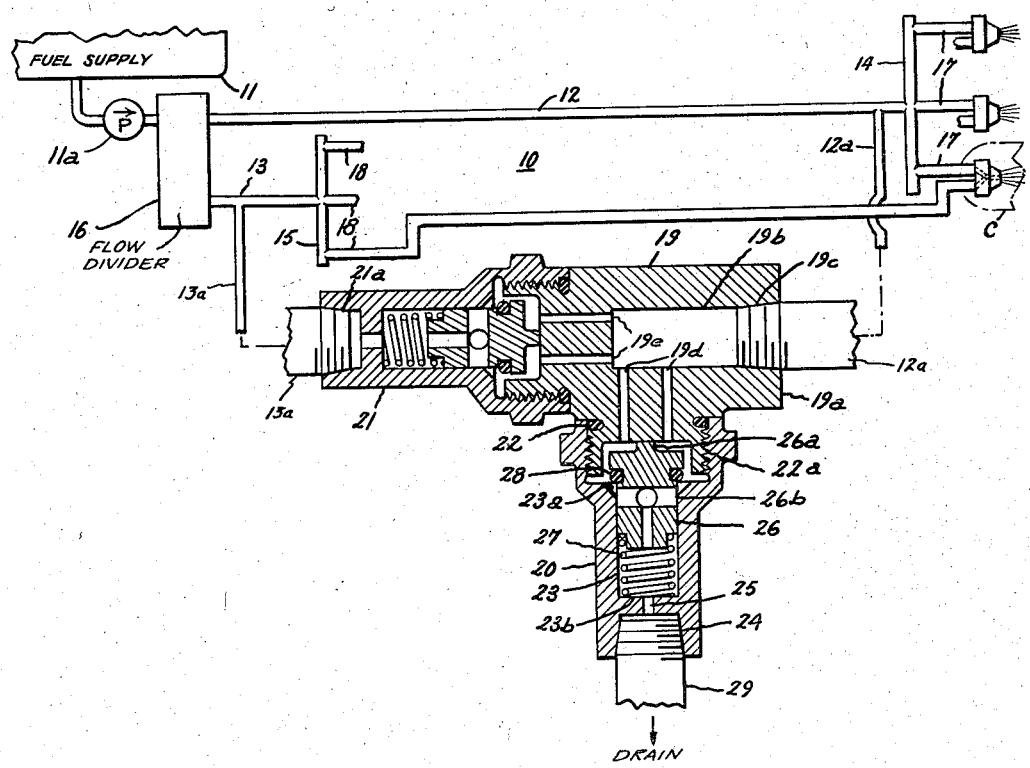
Inventors:
Jean A. F. Roché,
Raymond F. Bookmyer,
by Edward M. Zittle
Their Agent.

United States Patent Office 2,881,827
Patented Apr. 14, 1959

2,881,827
FUEL MANIFOLD DRAINAGE SYSTEM

Jean A. F. Roché, Reading, and Raymond F. Bookmyer, Rossmoyne, Ohio, assignors to General Electric Company, a corporation of New York Application June 24, 1953, Serial No. 363,712

3 Claims. (Cl. 158—36)

Our invention relates generally to thermal power plants and more particularly to the drain arrangement for the fuel manifolds supplying the spray nozzles used in aircraft gas turbine combustion chambers.

In the operation of present day jet propulsion aircraft, an everpresent problem exists in the drainage of unburnt fuel from the fuel injecting means, upon engine shutdown or failure to fire. This fuel collects in each chamber as it drains from the lines leading from the source of supply and may be beyond the immediate capacity of the combustion chamber drainage system, so that in case of a quick restart, as well as at other times, it adds to the starting hazards and may result in serious flame damage both to the aircraft and operating personnel.

An object of invention is to provide a simplified fuel manifold drain arrangement which is reliable and automatic in its operation.

Another object of invention is to provide an improved fuel manifold drain arrangement which is closed by a predetermined minimum fuel rate of flow.

Still another object of invention is to provide a drain valve arrangement for fuel supply manifold means which is kept closed under all normal operating conditions.

A further object of invention is to provide an improved fuel drain arrangement for aircraft gas turbines and the like in which fuel is supplied to a plurality of spray nozzles through manifold means.

A still further object of invention is to provide an improved structure for draining the fuel providing means for aircraft gas turbine combustion chambers when in non-operating state.

These and other objects of invention will become more apparent by reference to the following description taken in conjunction with the accompanying drawing, which illustrates a preferred embodiment of our invention and in which the figure is a diagrammatic representation of the discharge end of a fuel provision system for an aircraft gas turbine combustion chamber grouping, with an enlargement of the drainage valve assembly.

The objects of our invention may be realized by the interconnection of spring-loaded check valves, which are seated at a predetermined low fuel flow rate and arranged so that the drain valve assembly remains closed while the fuel is under pressure.

Referring to the drawing, the discharge end of a fuel providing system for use in aircraft gas turbine combustion chambers having duplex type vortex spray nozzles is disclosed generally at 10. The source of fuel is indicated at 11, with a pump 11a and conduits 12 and 13 leading therefrom to supply manifolds 14 and 15, respectively, through a flow divider 16 in the line.

The general characteristics and operation of the duplex type vortex spray nozzle, capable of employment with our improved fuel manifold drain arrangement, are more fully disclosed in U.S. Patent No. 2,524,820, issued to G. N. Miles, and Patent No. 2,590,853 to Fulton et al. In this type of nozzle, two independent series of tangentially arranged holes or slots are supplied with fuel for the combustion chamber. At low rates of flow and pressures, fuel is supplied through the smaller series of holes or slots; and as the pressure increases for larger rates of fuel flow, both series function simultaneously.

Independent flow paths are provided from the fuel supply to the separate slots, shown in our diagram as conduit 12 and header or manifold 14 supplying fuel through lines 17 to one series of slots and conduit 13 and header or manifold 15 supplying fuel through lines 18 for the other series of slots, one of each supplying the same combustion chamber indicated diagrammatically at C.

In duplex nozzle type fuel systems of the type described in the aforementioned Miles and Fulton et al. patents one set of the nozzle slots is relatively large as compared to the other set, with each set being supplied by one of the two fuel manifolds; hence one of the manifolds 14—15 may be termed the "small slot manifold" and the other the "large slot manifold," and for purposes of convenience such terms will be employed hereinafter. The function of the flow divider 16 is to apportion the fuel flow between the small slot manifold 14 and the large slot manifold 15, in the manner fully explained in the aforementioned patent to Fulton et al. If separate nozzles are used in preference to the duplex type, then flow divider 16 operates to apportion fuel between the two sets of nozzles in similar manner, permitting fuel flow to one set of the nozzles only on attainment of predetermined fuel supply pressure.

The drainage valve assembly indicated at 19 comprises a pair of similar spring loaded valves 20 and 21, and since they are the same, only the structure of valve 20 will be described in detail. Each valve is joined at its inlet 22 to chamber housing 19a by a screw thread as shown at 22a and each contains a cylindrical bore 23 communicating with outlet 24 by means of passage 25. The bore 23 terminates in an outwardly flaring valve seat at 23a, has a shoulder at 23b, and receives valve piston 26 in a loose sliding fit.

Spring 27 is housed within the bore 23 between shoulder 23b and the bottom of piston 26 and normally urges the valve piston into open position. Piston 26 has a head spacing projection 26a, which contacts the chamber housing 19a and limits the open position of the valve for drainage, and internal drain channels 26b, the function of which will be described later. An O-ring seal 28 fits within a groove adjacent the head of piston 26 and coacts with the flaring valve seat 23a, when the valve piston is in closed position.

The chamber housing 19a includes chamber 19b and is connected to small slot manifold conduit 12 by conduit 12a at drain inlet port 19c. Pressure outlets 19d and 19e communicate with the heads of the pistons in valves 20 and 21, respectively, the outlet of the latter valve being connected to large slot manifold drain conduit 13a at 21a, so that fuel pressure in conduit 13a is exerted against the base of the piston in valve 21 and acts in the same direction as the spring therein and tends to unseat the piston.

In operation, our novel fuel manifold drain arrangement works as follows: the initial supply of fuel at comparatively low pressure is provided to conduit 12 through flow divider 16 but due to the action of the flow divider, substantially no fuel reaches the large slot manifold 15. The low pressure fuel passes to small slot manifold 14 and eventually is sprayed from the small slots through lines 17 and also passes through conduit 12a into chamber 19b and through outlets 19d and 19e against the piston heads in valves 20 and 21, forcing them into closed or seated position, the O-rings at 28 furnishing the sealing. The pressure drop established by the minimum predetermined fuel rate of flow through the valves closes both of them positively against the drainage from conduits 12 and 13.

As the pressure of the fuel supply rises, the flow divider 16 becomes operative and fuel passes into the large slot manifold 15 and is sprayed from the large slots through lines 18. This fuel also passes through conduit 13a and against the base of the piston in valve 21 and though the opening force of the spring in valve 21 tends to move the piston in this valve into open position, however because of the force differential resulting from the pressure drop across the flow divider, which causes the pressure in line 13 to remain always below that in line 12, valve 21 remains closed. Since the pressure in conduits 12 and 12a, and in chamber 19b, is normally higher than in conduits 13 and 13a, higher pressure is acting also on the piston head in valve 20 and keeps it seated in closed position to prevent fuel drainage from the system.

When the pressure of the fuel supply drops as upon shutdown, the fuel in the supply conduits without any drainage system, would tend to drain into the combustion chambers and increase the fire danger. With our novel fuel manifold drain arrangement, any appreciable seepage thereinto is forestalled.

The spring 27 in valve 20, upon release of the fuel supply pressure, will unseat the piston and break the O-ring seal, so that any fuel remaining in conduits 12 and 12a will drain into the housing chamber 19b, through the ports 19d, around the piston head and over the valve seat 23a, whence it can leak past the loose fit between the valve piston 26 and the walls of bore 23, as well as flow out through passages 26b and 25 into the overboard drain conduit 29, or to some other drainage disposal means.

The drainage flow in valve 21 will be the reverse of that in valve 20, since with the pressure differential resulting from the opening force of the valve spring, the piston will become unseated and the flow will be up through the internal piston passages 26b and past the piston and through ports 19e into housing chamber 19b and then out through ports 19d and valve 20.

In this manner, it will be apparent that the pressure drop established by the fuel rate of flow will close both manifold drainage valves, that upon increase in pressure, though the relatively lower large slot manifold pressure will tend to open drain valve 21, however both valves 20 and 21 will be kept in closed or seated position, and that upon release of the fuel supply pressure, both valves will open and the fuel will drain from conduits 12 and 13 and manifolds 14 and 15.

Although many changes can be made in the disclosed structure without departing from the scope of the appended claims, it is intended that all matter contained in the preceding description or shown in the accompanying drawing shall be interpreted as illustrative and not limitative.

What we claim as new and desire to secure by Letters Patent of the United States is:

1. In combination with a fuel system for combustion chambers of a gas turbine engine, said fuel system having fuel supply means providing pressurized fuel to at least two fuel nozzle means, said fuel system including flow divider means operative to control fuel flow to at least one of said nozzle means in dependence on fuel supply pressure and operative to maintain the pressure in said one nozzle means below the pressure in the remaining nozzle means during such time as fuel is supplied to said one nozzle means; fuel drainage apparatus comprising valve housing means including a pair of fuel inlets, fuel drainage outlet means and passage means interconnecting said fuel inlets and said drainage outlet means; a pair of conduit means, one conduit means connecting one of said fuel inlets to said one of said nozzle means and the other conduit means connecting the other of said fuel inlets to the remaining one of said nozzle means; and valve means movable between first and second positions in said housing means and arranged to close said passage means to prevent flow between said fuel inlets and said drainage outlet means when disposed in said first position and to open said passage means to permit drainage from both said fuel inlets to said drainage outlet means when disposed in said second position, said valve means including a first pair of opposed surfaces, one of which is exposed to fuel pressure at said one of said fuel inlets and the other of which is exposed to fluid pressure at the other of said fuel inlets, and a second pair of opposed surfaces, one of which is exposed to the fuel pressure at said other of said fuel inlets and the other of which is exposed to the pressure in the drainage outlet means, whereby movement of said valve means between said second and first positions is dependent upon a difference in fuel pressures between said fuel inlets and a difference of the pressure in said other fuel inlet and the pressure of the fluid in the drainage outlet means.

2. In combination with a fuel system for combustion chambers of a gas turbine engine, said fuel system having fuel supply means providing pressurized fuel to a pair of fuel nozzle means and including flow divider means operative to effect a difference in pressure of fuel supply at the two fuel nozzle means; fuel drainage apparatus comprising valve housing means including at least two fuel inlets, fuel drainage outlet means and passage means interconnecting said fuel inlets and said drainage outlet means; a pair of conduit means, one conduit means connecting one of said fuel inlets to one of said nozzle means and the other conduit means connecting the other of said fuel inlets to the remaining one of said nozzle means; a pair of valve members each movable between first and second positions in said housing means and arranged to close said passage means to prevent flow between said fuel inlets and said drainage outlet means when disposed in said first position and to open said passage means to permit drainage from said fuel inlets to said drainage outlet means when disposed in said second position; spring means biasing said valve members towards said second position; both said valve members having a first surface exposed to fluid pressure at one of said fuel nozzle means with said first surface being so disposed that fuel pressure at said one nozzle means urges said valve members towards said first position in opposition to said spring means, one of said valve members having a second surface exposed to fuel pressure at the other of said fuel nozzle means whereby the movement of said one valve member between said first and second positions is at least partially dependent upon the difference between fuel pressures at the two said nozzle means.

3. In combination with a fuel system for combustion chambers of a gas turbine, said fuel system having fuel supply means providing pressurized fuel to a pair of fuel nozzle means and including flow divider means operative to effect a difference in pressure of fuel supply at the two fuel nozzle means; fuel drainage apparatus comprising fuel valve housing means defining at least two fuel inlets, fuel drainage outlet means and first and second valve bores each interconnecting one of said fuel inlets to said drainage outlet means, each of said valve bores having a valve seat disposed between the ends of the bore; a pair of conduit means, one conduit means connecting one of said fuel inlets to said one of said nozzle means and the other conduit means connecting the other of said fuel inlets to the remaining one of said nozzle means; a first valve piston member movable between first and second positions in said first valve bore; a second valve piston member movable between first and second positions in said second valve bore, each of said valve piston members including seating means engageable with its respective valve seat to prevent flow between said fuel inlets and said drainage outlet means when said valve piston member is disposed in said first position, said piston members when disposed in said second position permitting fuel flow through said valve bores around the piston members with the resultant pressure drop across the piston members tending to urge them toward said first position; and spring means biasing said valve piston members towards said second position; at least one of said valve piston members including opposed surfaces, one of which is exposed to fuel pressure at one of said fuel inlets and another of which is exposed to fuel pressure at the other of said fuel inlets, whereby the movement of said one valve member between said first and second positions is at least partially dependent on a difference between fuel pressures at said fuel inlets.

References Cited in the file of this patent

UNITED STATES PATENTS

| | | |
|---|---|---|
| 86,195 | Windell et al. | Jan. 26, 1869 |
| 1,381,049 | Abbamonte | June 7, 1921 |
| 2,590,853 | Fulton | Apr. 1, 1952 |
| 2,619,162 | Feilden | Nov. 25, 1952 |
| 2,626,655 | Trauntman et al. | Jan. 27, 1953 |